United States Patent [19]
Yesel

[11] Patent Number: 5,489,007
[45] Date of Patent: Feb. 6, 1996

[54] DYNAMIC BRAKING ON AN ALL WHEEL DRIVE MACHINE

[75] Inventor: Leon P. Yesel, East Peoria, Ill.

[73] Assignee: Caterpillar Inc., Peoria, Ill.

[21] Appl. No.: 275,857

[22] Filed: Jul. 15, 1994

[51] Int. Cl.$^6$ .................................................. B60K 28/16
[52] U.S. Cl. ........................ 180/243; 180/306; 180/307; 303/190
[58] Field of Search ................................... 303/3, 10, 15, 303/20, 100; 188/156; 180/243, 306, 307, 308, 367, 24.07; 477/186, 188, 218

[56] References Cited

U.S. PATENT DOCUMENTS

| | | | |
|---|---|---|---|
| 3,841,423 | 10/1974 | Holtkamp et al. | 180/306 X |
| 4,317,331 | 3/1982 | Aruga et al. | 180/307 X |
| 4,530,416 | 7/1985 | Kassai | 180/307 |
| 4,554,991 | 11/1985 | Eden | 180/307 X |
| 4,866,622 | 9/1989 | Dreher et al. | 180/306 X |
| 5,147,010 | 9/1992 | Olsen et al. | 180/308 X |

*Primary Examiner*—Robert J. Oberleitner
*Assistant Examiner*—Lee W. Young
*Attorney, Agent, or Firm*—John L. James

[57] ABSTRACT

Dynamic braking on the all wheel drive front wheel motors of a motor grader is implemented by turning on all the wheel drive system, depressing the inching pedal, sensing brake pressure, determining ground speed, determining a pump set point current using the ground speed, and setting actual pump current to 90% of set point current. Both sides of the drive loop are monitored and the high side pressure is used to control loop pressure. Motor displacement which is normally controlled by shift lever position is set to low displacement for braking. When the all wheel drive system is turned off, the inching pedal is released, or there is a loss of brake pressure the all wheel drive system disengages. The pump upstrokes to provide an anti-lock feature when the desired brake pressure is less than 30% of the set point. The pump upstrokes to reduce pressure and thereby limit maximum pressure when the desired brake pressure exceeds 30,000 kPa. When the desired brake pressure exceeds 90% of the set point the pump upstrokes to prevent the pump from driving the wheel motors.

10 Claims, 7 Drawing Sheets

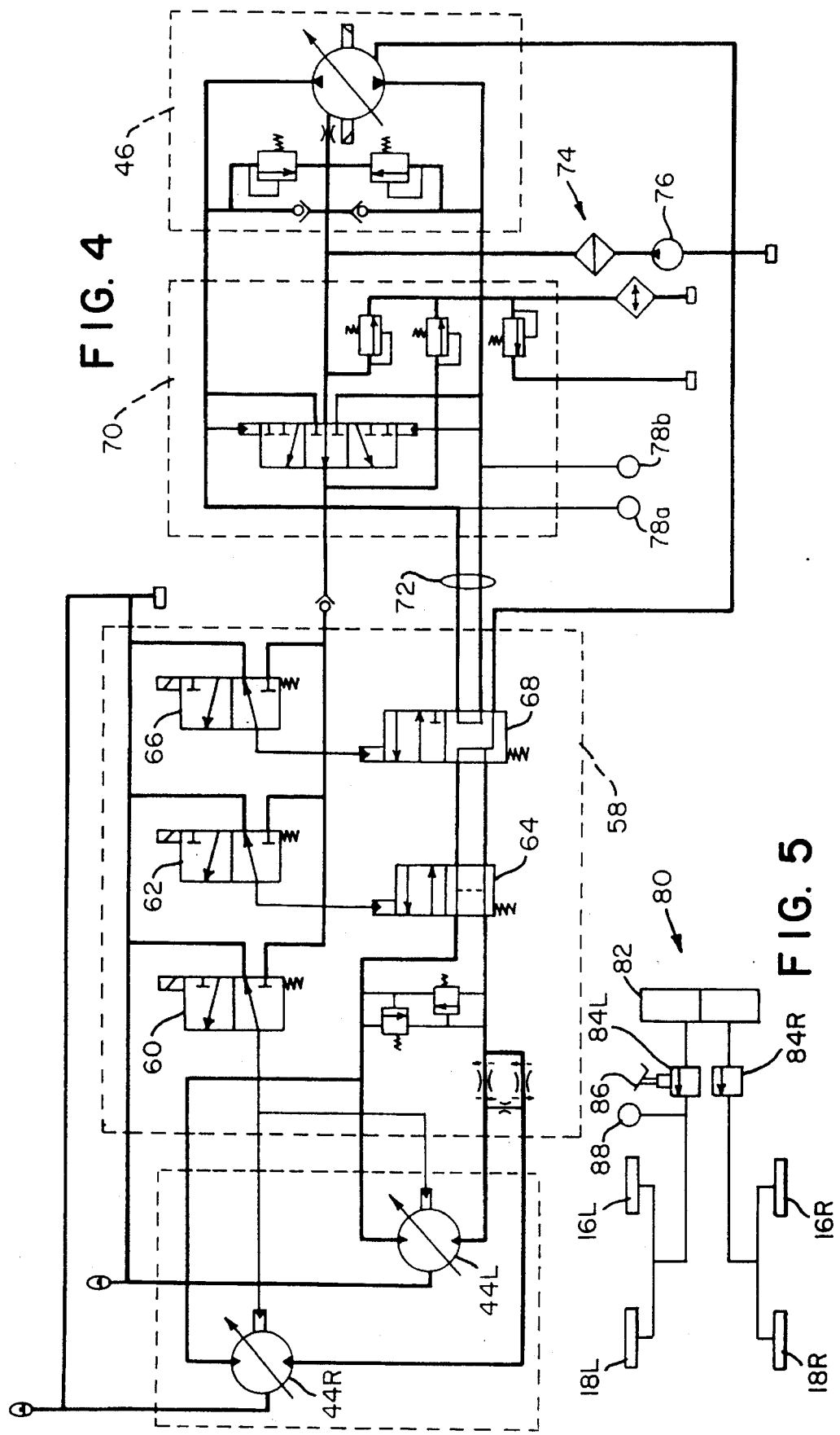

DYNAMIC BRAKING ON AN ALL WHEEL DRIVE MACHINE

TECHNICAL FIELD

The present invention pertains to an all wheel drive machine, and, more particularly, to a method and apparatus for braking all wheel drive front wheels.

BACKGROUND OF THE INVENTION

Earth moving equipment, such as a motor grader for example, often must operate in environments with poor footing conditions. Some earth moving machines are equipped with an all wheel drive system so that the front wheels of the machine, normally used for steering, are driven to help propel the machine in these poor footing conditions. Normally, only the rear wheels are driven, but when poor footing conditions are encountered causing excessive wheel slip, the front wheels of an all wheel drive machine can be driven to increase traction of the machine thereby reducing slip and maintaining directional control. When all wheels are in poor footing conditions, such as when working on side slopes, or maximum traction is desired, the machine can be operated in an all wheel drive mode. Operating a motor grader in an all wheel drive mode for maximum traction may be desirable when the motor grader is performing a cutting operation, such as cutting a new road or grading a severe side slope. The all wheel drive mode is also useful when a motor grader is used for removing snow from a roadway.

In a motor grader, depressing a brake pedal normally applies brake pressure to the rear wheels, which are the driven wheels, to stop the machine. The same is true for an all wheel drive machine. It can be appreciated that it would be highly desirable to also brake the front wheels when operating in an all wheel drive mode. Braking the front wheels could improve braking response and increase the life of the rear wheel braking system because the front wheels would assume part of the braking load.

DISCLOSURE OF THE INVENTION

The present invention is directed to overcoming the problem set forth above. According to one aspect of the present invention, a method is provided for dynamically braking an all wheel drive machine having a transmission shiftable with a shift lever, a braking system for braking one set of wheels, and a pump for hydraulically driving a second set of wheels using pressurized fluid circulating in forward and reverse loops for effecting all wheel drive. The method includes turning on the all wheel drive system, depressing an inching pedal, sensing brake pressure, determining ground speed, determining a pump set point current using ground speed, and setting actual pump current to 90% of set point current. The method also includes sensing fluid pressure in the forward and reverse loops using the shift lever as a determinant making fluid pressure in the loop in the position of the shift lever the shift lever side pressure and fluid pressure in the other loop in the position opposite of the shift lever the opposite side pressure, then determining whether the shift lever side pressure is greater than the opposite side pressure and using the opposite side pressure when the shift lever side pressure is not greater than the opposite side pressure, and setting desired brake pressure to 8,000 kPa plus the sensed brake pressure times a constant when the initial desired brake pressure is greater than 30% of the set point, less than 30,000 kPa and less than 90% of the set point. The method also includes disengaging the all wheel drive system when the all wheel drive system is turned off, the inching pedal is released, or there is a loss of brake pressure, and upstroking the pump when the initial desired brake pressure is not greater than 30% of the initial set point, when the initial desired brake pressure is not less than 30,000 kPa or when the initial desired brake pressure is less than 90% of the set point.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 4 is a schematic diagram of the hydraulic circuit for the all wheel drive motors of the motor grader of FIG. 1.

FIG. 5 is a diagram of the brake circuit for the motor grader of FIG. 1.

BEST MODE FOR CARRYING OUT THE INVENTION

Figure 1:
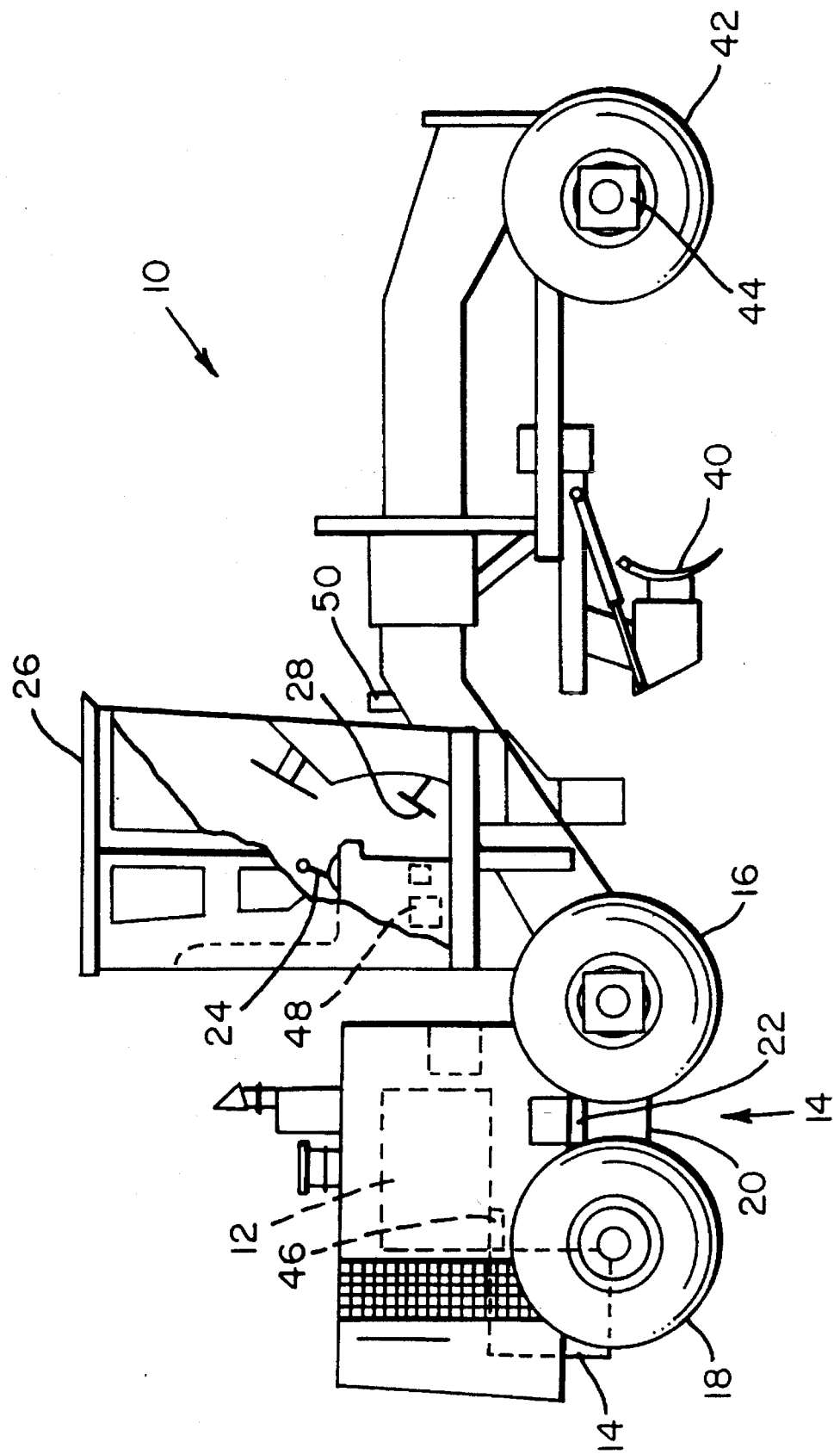
FIG. 1 is a diagrammatic side elevational view of a preferred embodiment of a motor grader constructed for operation in accordance with the present invention.
Figure 2:
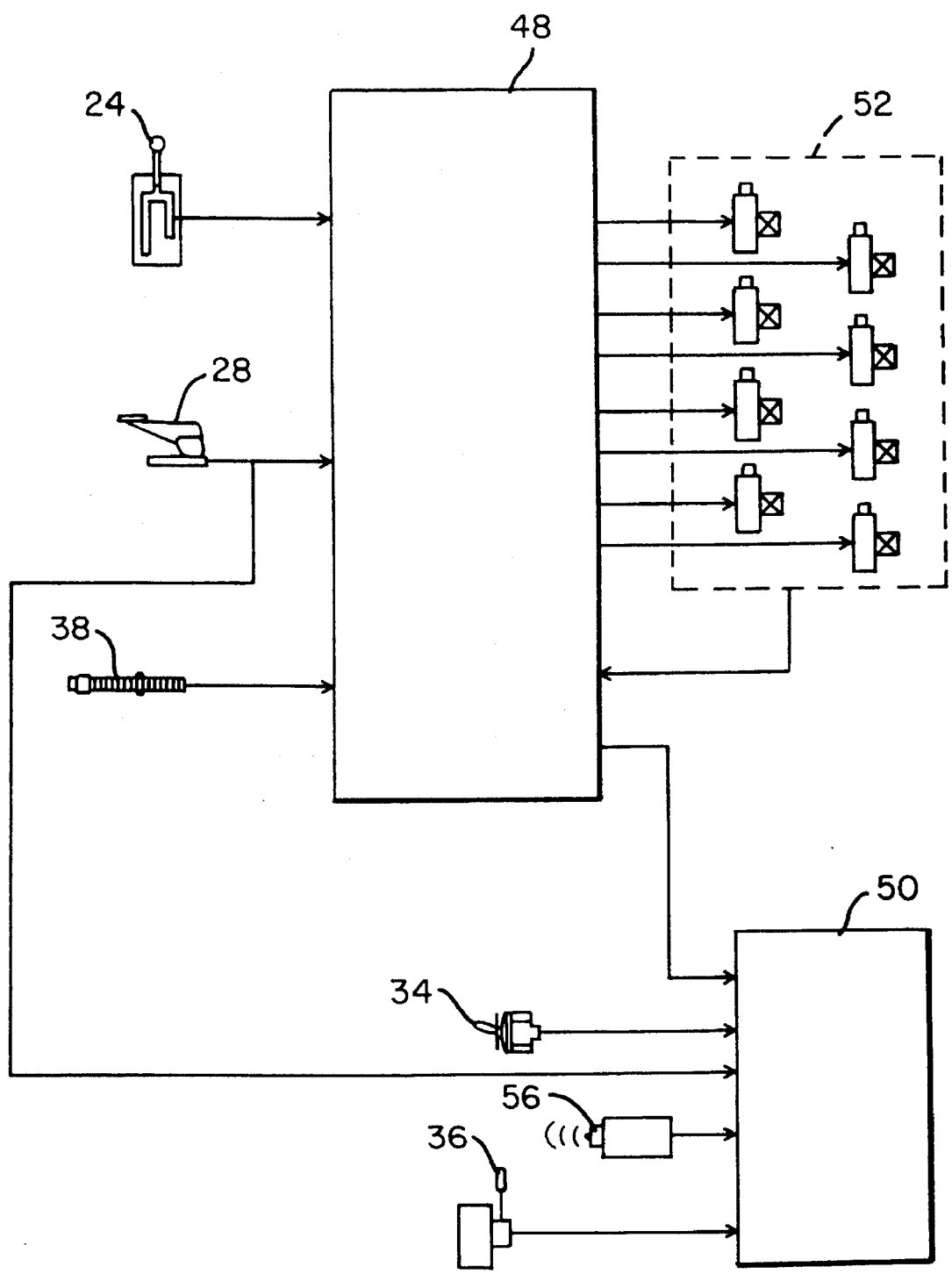
FIG. 2 is a schematic block diagram of the transmission controller of the motor grader of FIG. 1 showing inputs and outputs.

Referring to FIGS. 1 and 2, a motor grader 10 has an engine 12 driving a main drive 14. The main drive 14 includes tandem mounted rear wheels 16, 18 driven by the engine 12 through an electronically controlled and hydraulically actuated transmission 20, and a rear differential 22. The transmission 20 is responsive to a gear shift lever 24 located in an operator's compartment 26, an all wheel drive switch 34, and a torque control lever 36. The transmission is preferably a countershaft transmission with an output shaft whose rotation is sensed by a transmission output shaft (TOS) sensor 38. The motor grader blade 40 is attached to the frame of the motor grader 10 between the rear wheels 16 and front wheels 42. In the all wheel mode of operation, the front wheels 42 are driven by wheel motors 44 that receive pressurized fluid from a pump 46. Electronic transmission controls 48 are located in the cab 26 under the operator's seat along with an electronic all wheel drive controller 50 in front of the operator's cab.

The transmission controller 48 receives inputs from the transmission shift lever 24, the inching pedal 28 and the TOS sensor 38. The controller 48 provides outputs to all wheel drive controller 50 and the transmission solenoids 52 which operate the hydraulic control module 54 to shift the transmission through its eight forward and six reverse gears. The transmission solenoids 52 control the transmission clutches and determine the actual gear in which the transmission operates. Another output from the transmission controller 48 is an input to the all wheel drive controller 50. Other inputs to the all wheel drive controller 50 include an input from the all wheel drive switch 34, the torque control lever 36, and a motor grader ground speed sensor, such as radar ground speed sensor 56. While other methods of determining machine speed may be used, the radar is preferred because it gives an indication of ground speed that is independent of the wheels and therefore is not as susceptible to errors caused by wheel slip.

Figure 3:
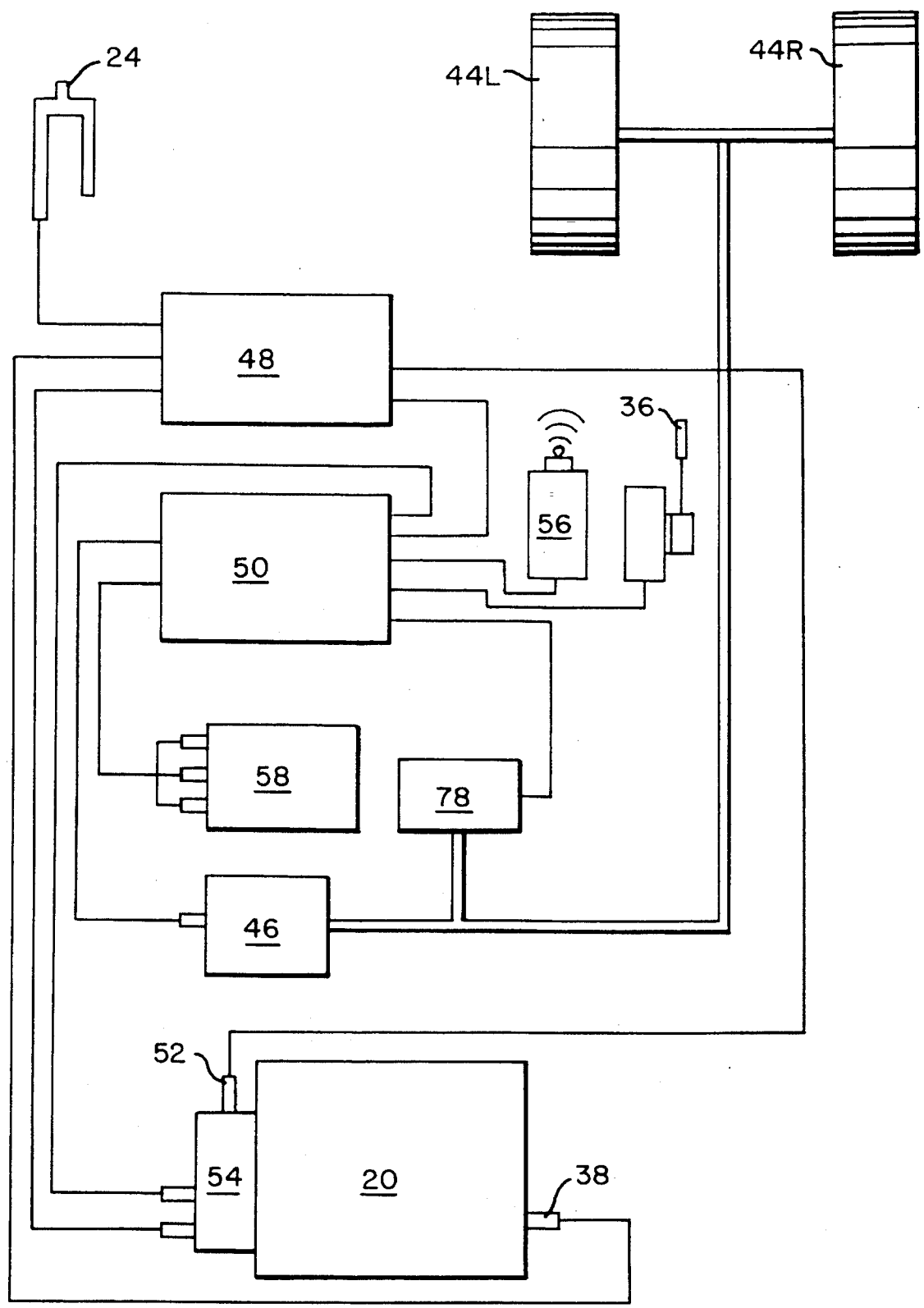
FIG. 3 is a schematic block diagram of the transmission controller and all wheel drive controller of the motor grader of FIG. 1.

Referring now to FIGS. 3 and 4, a control valve 58 is preferably located on the motor grader frame directly above the front axle. The control valve 58 contains a displacement solenoid 60 which controls spool shifting for motor displacement, a freewheel solenoid 62 which controls a freewheel spool 64 for freewheel mode activation, and a charge solenoid 66 which controls a charge spool 68 for charge circuit engagement. The all wheel drive hydraulic system schematic of FIG. 4 shows the wheel motors 44L, 44R, control valve 58, flushing valve 70 and pump 46 that are the primary mechanical system components. Located directly in front of the cab 26 is the flushing valve 70. Its function is to maintain system charge pressure and connect the low pressure side of the drive loop 72, which is determined by the direction of travel, to the charge circuit 74. The charge pump 76 is located under the cab 26 of the motor grader 10 and is preferably mounted on the hydraulic implement pump. It supplies system charge flow and any additional makeup flow required in the drive loop of the all wheel drive system. The all wheel drive system preferably shares the same hydraulic reservoir as the implements.

A convenient location for the pump 46 is on the left-hand side of the motor grader between the differential case and the transmission. The pump is driven off the transmission and supplies the flow requirements to drive the front wheel motors 44. Pressure sensors 78A, 78B are used to monitor pressure in the drive loop 72. When the pump 46 supplies fluid to drive the wheel motors 44 in a forward direction to propel the motor grader in the forward direction, pressure sensor 78A is the high pressure sensor while sensor 78B is the low pressure sensor. Conversely, when pump 46 operates to drive the motor grader in the reverse direction, then pressure sensor 78B is the high pressure sensor while sensor 78A is the low pressure sensor.

Referring to FIG. 5, a braking system 80 includes a reservoir 82 containing pressurized air that is metered through valves 84 to the rear wheels 16, 18. The valves 84 are controlled by operation of a brake pedal 86 that is actuated by an operator. Brake pressure is monitored by a pressure sensor 88.

Figure 6A:
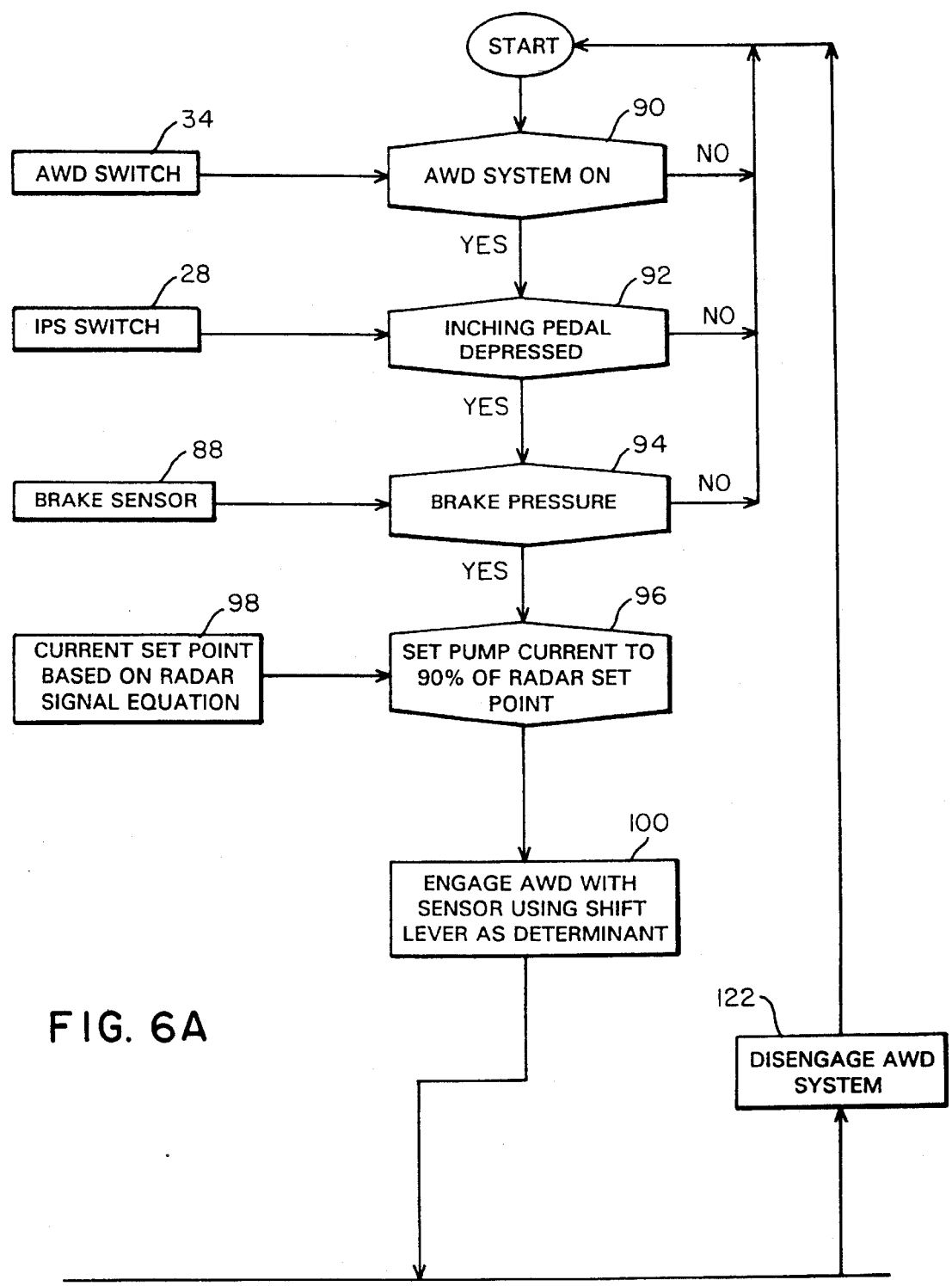
FIGS. 6A and 6B are a flowchart illustrating a method for dynamic braking on an all wheel drive motor grader.
Figure 6B:
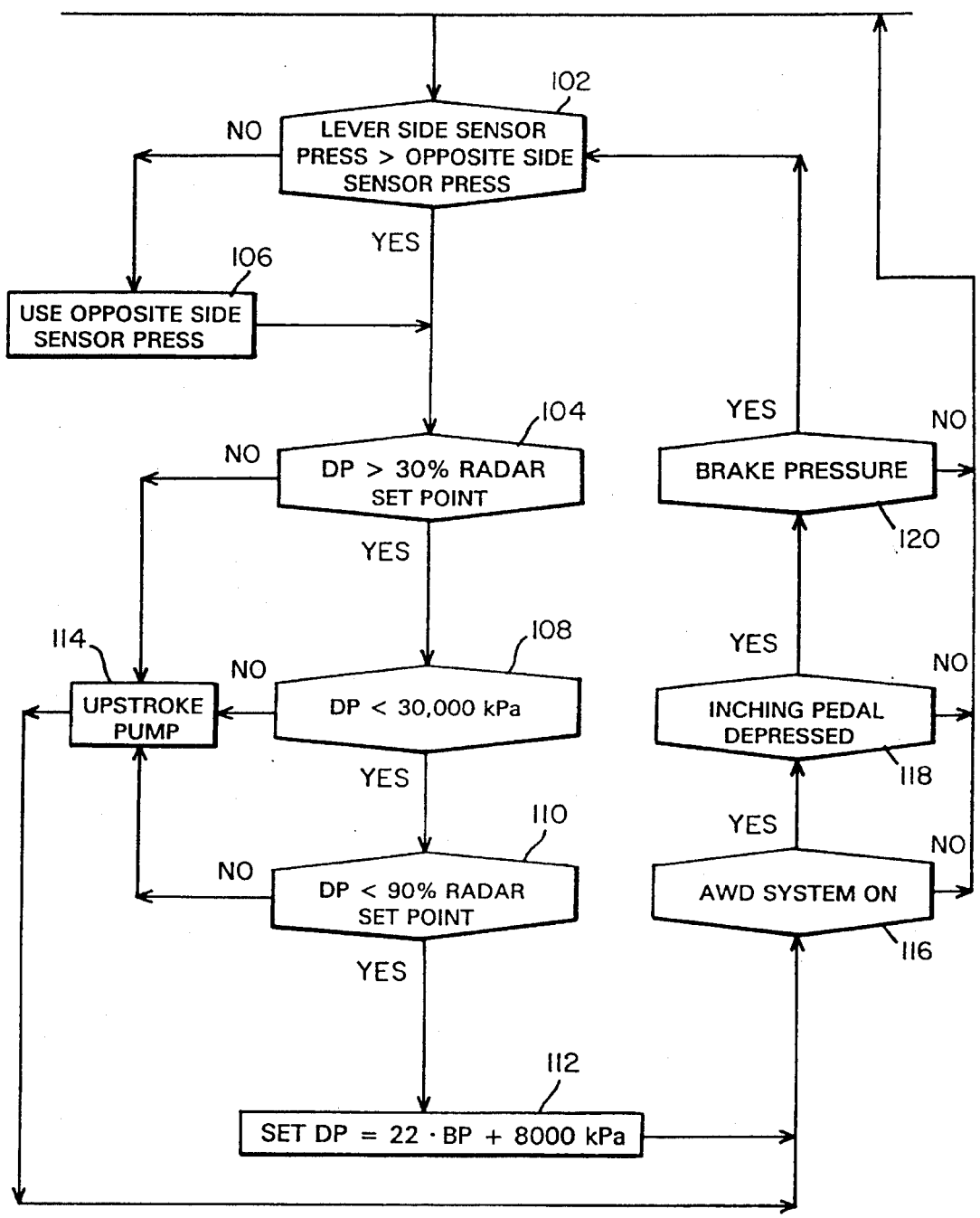
Figure 7:
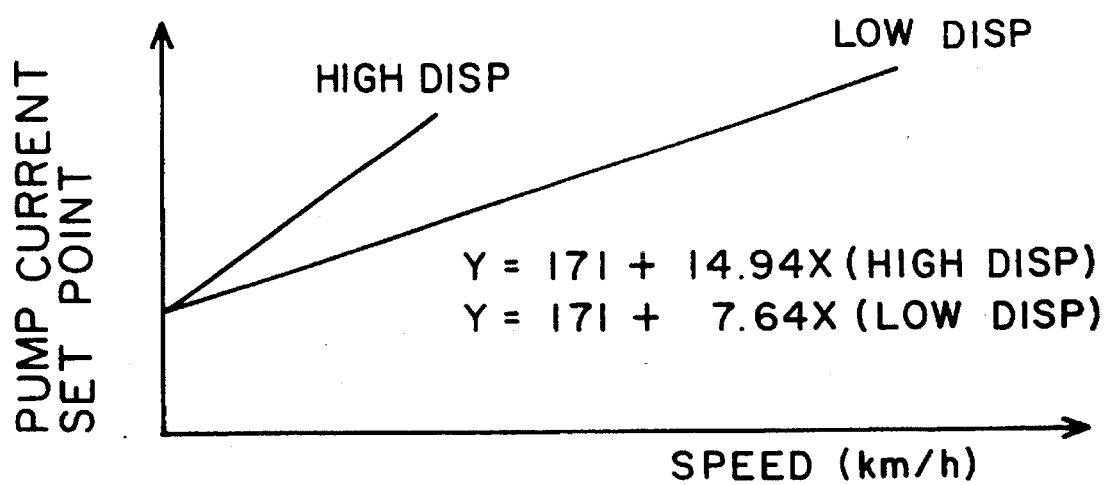
FIG. 7 graphically illustrates the pump current set point as a function of radar speed for high and low displacement of the wheel motors.

FIGS. 6A and 6B are a flowchart illustrating a method for dynamic braking on an all wheel drive motor grader. At the start of the method, the all wheel controller 50 determines whether the all wheel drive system is turned on at block 90 based upon a signal from the all wheel drive switch 34. When the all wheel drive system is on, the all wheel drive controller determines whether the inching pedal is depressed by receiving a signal from the inching pedal at block 92. Next, it is determined whether there is brake pressure based upon a signal from the brake pressure sensor 88 at decision block 94. When the all wheel drive system is turned on, the inching pedal is depressed and there is brake pressure, then at block 96 the pump current is set to 90% of the radar set point current (FIG. 7 graphically illustrates the pump current set point as a function of radar speed for high and low displacement of the wheel motors). At block 98, the current set point is determined based upon the radar signal equation at block 98 and input to block 96 for setting pump current. The next step at block 100 is to engage the all wheel drive with the loop pressure sensors 78A, 78B using the shift lever as a determinant. The shift lever should be in one of the forward gears or one of the reverse gears. If the shift lever is in neutral, the pump pressure in the loop should be the same in both the forward and reverse directions since no pressure is required in neutral to propel the front wheels of the all wheel drive machine. Thus, the shift lever will be in either forward or reverse and a corresponding portion of the hydraulic circuit loop is considered the shift lever side loop depending upon whether the pump is to be operated in the forward or the reverse direction to properly propel the machine.

The method continues at decision block 102 where it is determined whether the shift lever side sensor pressure is greater than the opposite side sensor pressure. If the shift lever side sensor pressure is not greater than the opposite side sensor pressure, then at block 106 the opposite side sensor pressure is used and a determination is made at decision block 104. It is determined at block 104 whether the initial desired pressure is greater than 30% of the pressure determined by the radar set point. When the opposite side sensor pressure is greater than the shift lever side sensor pressure, the pump is operating in the reverse direction and should be reversed. After setting pump current at block 96 and sensing brake pressure at block 94, then the greater of the shift lever side pressure and the opposite side pressure is used as an initial brake pressure at blocks 104, 108 and 110 for updating desired pressure at block 112 or upstroking the pump at block 114.

When the initial desired pressure is greater than 30% of the pressure based upon the radar set point at decision block 104, the initial desired pressure is less than 30,000 kPa at block 108, and the initial desired pressure is less than 90% of the pressure based upon the radar set point at block 110, then at block 112, the desired pressure is set based upon the brake pressure. The desired pressure is set to equal 22 times the brake pressure plus 8,000 kPa.

If the initial desired pressure is not greater than 30% of the pressure based upon the radar set point, or the initial desired pressure is not less than 30,000 kPa, or the initial desired pressure is not less than 90% of the radar set point, then at block 114, the pump is upstroked. To prevent the pump from driving the wheel motors, a maximum drive pressure is set at 90% of the machine radar speed. Also, to provide an anti-lock function, the minimum drive pressure is set at 30% of the machine radar speed. The maximum pressure limit is 30,000 kPa. Any pressure sensed above this value would cause the pump to upstroke resulting in a pressure reduction.

After the pump is upstroked at block 114, or after the desired brake pressure is set at block 112, the process continues by determining whether the all wheel drive system is on at block 116, determining whether the inching pedal is depressed at block 118, and determining whether there is brake pressure at block 120. If the answer to all of these is yes, then the process continues from block 102 where it is determined whether the shift lever side sensor pressure is greater than the opposite side sensor pressure. If, after block 112 and 114, the all wheel drive system is off, or the inching pedal is not depressed, or there is no brake pressure, then the all wheel drive system is disengaged at block 122 and the process restarts by determining whether the all wheel drive system is on at block 90.

It will be now appreciated that there has been presented a method for dynamic braking on the all wheel drive front wheel motors of a motor grader. The method is implemented by turning on all the wheel drive system, depressing the inching pedal, sensing brake pressure, determining ground speed, determining a pump set point current using the ground speed, and setting actual pump current to 90% of set point current. Both sides of the drive loop are monitored and the high side pressure is used to control loop pressure. Motor displacement which is normally controlled by shift lever position is set to low displacement for braking. When the all wheel drive system is turned off, the inching pedal is released, or there is a loss of brake pressure the all wheel drive system disengages. The pump upstrokes to provide an anti-lock feature when the desired brake pressure is less than 30% of the set point. The pump upstrokes to reduce pressure and thereby limit maximum pressure when the desired brake pressure exceeds 30,000 kPa. When the desired brake pressure exceeds 90% of the set point the pump upstrokes to prevent the pump from driving the wheel motors.

INDUSTRIAL APPLICABILITY

Dynamic braking on the all wheel drive front wheel motors of a motor grader is implemented by turning on all the wheel drive system, depressing the inching pedal, sensing brake pressure, determining ground speed, determining a pump set point current using the ground speed, and setting actual pump current to 90% of set point current. The next steps are sensing fluid pressure in the forward and reverse loops using the shift lever as a determinant making fluid pressure in the loop in the position of the shift lever the shift lever side pressure and fluid pressure in the other loop in the position opposite of the shift lever the opposite side pressure, determining whether the shift lever side pressure is greater than the opposite side pressure and using the opposite side pressure when the shift lever side pressure is not greater than the opposite side pressure, and setting desired brake pressure to 8,000 kPa plus the sensed brake pressure times a constant (22×BP) when the desired brake pressure is greater than 30% of the set point, less than 30,000 kPa and less than 90% of the set point.

When the all wheel drive system is turned off, the inching pedal is released, or there is a loss of brake pressure the all wheel drive system disengages. The pump upstrokes to provide an anti-lock feature when the desired brake pressure is less than 30% of the set point. The pump upstrokes to reduce pressure and thereby limit maximum pressure when the desired brake pressure exceeds 30,000 kPa. When the desired brake pressure exceeds 90% of the set point the pump upstrokes to prevent the pump from driving the wheel motors.

As is evident from the foregoing description, certain aspects of the invention are not limited to the particular details of the examples illustrated, and it is therefore contemplated that other modifications and applications will occur to those skilled in the art. For example the pump current could be set a values other than the percentages illustrated herein and may vary with upon the pumps and motors used. It is accordingly intended that the claims shall cover all such modifications and applications as do not depart from the true spirit and scope of the invention.

What is claimed is:

1. A method for dynamically braking an all wheel drive machine having a transmission shiftable with a shift lever, a braking system for braking a first set of wheels, and a pump for hydraulically driving a second set of wheels using pressurized fluid circulating in forward and reverse drive loops for effecting all wheel drive, comprising the steps of:

turning on an all wheel drive system;

depressing an inching pedal;

sensing brake air pressure to said first set of wheels;

determining ground speed of said machine;

determining a pump set point current using ground speed;

setting actual pump current to 90% of the set point current;

sensing fluid pressure in the forward and reverse drive loops using said shift lever as a determinant;

designating fluid pressure in one of said forward and reverse drive loops corresponding to a shift position of the shift lever as the shift lever side drive loop pressure and fluid pressure in the other drive loop in the position opposite of the shift lever the opposite side drive loop pressure;

determining the greater of said shift lever side drive loop pressure and said opposite side drive loop pressure;

using the greater of said shift lever side drive loop pressure and opposite side drive loop pressure as initial desired brake pressure; and setting desired brake pressure for said second set of wheels to 8,000 kPa plus the sensed brake air pressure times a predetermined constant when the initial desired brake pressure is greater than a brake pressure corresponding to a pump current that is 30% of said set point current, less than 30,000 kPa and less than a brake pressure corresponding to a pump current that is 90% of said set point current whereby said second set of wheels are driven at a slower rate of speed than said first set of wheels to brake said machine.

2. A method, as set forth in claim 1, including disengaging the all wheel drive system when the all wheel drive system is turned off, the inching pedal is released, or there is a loss of brake pressure.

3. A method, as set forth in claim 1, including upstroking the pump when the initial desired brake pressure is not greater than a brake pressure corresponding to a pump current that is 30% of the set point current.

4. A method, as set forth in claim 1, including upstroking the pump when the initial desired brake pressure is not less than 30,000 kPa.

5. A method, as set forth in claim 1, including upstroking the pump when the initial desired brake pressure is less than a brake pressure corresponding to a pump current that is 90% of the set point current.

6. Dynamic braking apparatus for an all wheel drive machine, said machine having a transmission shiftable with a shift lever, a braking system for braking a first set of wheels, and a pump for hydraulically driving a second set of wheels using pressurized fluid circulating in forward and reverse drive loops for effecting all wheel drive, said dynamic braking apparatus comprising:

a switch for mining on an all wheel drive system;

an inching pedal;

a brake pressure sensor sensing brake air pressure to said first set of wheels;

means for determining ground speed of said machine;

means for determining a pump set point current using ground speed;

means for setting actual pump current to 90% of set point current;

sensors for sensing fluid pressure in the forward and reverse drive loops, fluid pressure in one of said forward and reverse drive loops corresponding to a shift position of the shift lever being designated as the shift lever side drive loop pressure and fluid pressure in the other drive loop in the position opposite of the shift lever being designated as the opposite side drive loop pressure;

means for determining the greater of said shift lever side drive loop pressure and said opposite side drive loop pressure and using said greater pressure as an initial desired brake pressure; and means for automatically setting desired brake pressure for said second set of wheels to 8,000 kPa plus the sensed brake air pressure times a predetermined constant when the initial desired brake pressure is greater than a brake pressure corresponding to a pump current that is 30% of said set point current, less than 30,000 kPa and less than a brake pressure corresponding to a pump current that is 90% of said set point current.

7. An apparatus, as set forth in claim 6, including means for disengaging the all wheel drive system when the all wheel drive system is turned off, the inching pedal is released, or there is a loss of brake pressure.

8. An apparatus, as set forth in claim 6, including means for upstroking the pump when the initial desired brake pressure is not greater than a brake pressure corresponding to a pump current that is 30% of the set point current.

9. An apparatus, as set forth in claim 6, including means for upstroking the pump when the initial desired brake pressure is not less than 30,000 kPa.

10. An apparatus, as set forth in claim 6, including means for upstroking the pump when the initial desired brake pressure is less than a brake pressure corresponding to a pump current that is 90% of the set point current.

* * * * *